United States Patent [19]
Edele et al.

[11] Patent Number: 5,454,134
[45] Date of Patent: Oct. 3, 1995

[54] WINDSHIELD WASHING SYSTEM WITH FLUID PIPE IN WIPER SHAFT

[75] Inventors: Reinhard Edele, Sachsenheim; Reinhard Johannes, Eberstadt-Holzern; Oldrich Krizek, Bietigheim-Bissingen; Eckhardt Schmid, Brackenheim; Eugen Gorner, Ingersheim; Helmut Karl, Schwaigern, all of Germany

[73] Assignee: SWF Auto Electric GmbH, Germany

[21] Appl. No.: 965,275

[22] PCT Filed: May 20, 1992

[86] PCT No.: PCT/EP92/01122

§ 371 Date: Jun. 22, 1993

§ 102(e) Date: Jun. 22, 1993

[87] PCT Pub. No.: WO92/21536

PCT Pub. Date: Dec. 10, 1992

[30] Foreign Application Priority Data

May 25, 1991 [DE] Germany .......................... 41 17 107.1

[51] Int. Cl.[6] ......................................... B60S 1/46
[52] U.S. Cl. .................................. 15/250.04; 15/250.34; 239/284.1; 239/26; 239/264; 285/921; 285/330; 285/98
[58] Field of Search ................ 15/250.01, 250.02, 15/250.03, 250.04, 250.35, 250.34, 250.30; 239/284.1, 284.2, 261, 264; 285/121, 330, 95, 225, 226, 98, 14, 134, 165, 347

[56] References Cited

U.S. PATENT DOCUMENTS

| | | | |
|---|---|---|---|
| 2,367,447 | 1/1945 | Strout | 285/330 |
| 2,818,232 | 12/1957 | Osmun | 285/330 |
| 3,230,564 | 1/1966 | McDevitt | 15/250.04 |
| 3,394,954 | 7/1968 | Sarne | 285/347 |
| 3,887,956 | 6/1975 | Wind | 15/250.04 |
| 4,600,222 | 7/1986 | Appling | 285/921 |
| 4,920,602 | 5/1990 | Kuehbauch | 15/250.34 |
| 5,083,339 | 1/1992 | Bristow | 15/250.04 |
| 5,195,206 | 3/1993 | Bauer et al. | 15/250.01 |

FOREIGN PATENT DOCUMENTS

| | | | |
|---|---|---|---|
| 0351527 | 1/1990 | European Pat. Off. . | |
| 1295138 | 4/1962 | France . | |
| 2600767 | 7/1971 | Germany | 15/250.04 |
| 3521024 | 1/1986 | Germany | 15/250.01 |
| 3632734 | 3/1988 | Germany | 15/250.01 |
| 3643476 | 6/1988 | Germany . | |
| 3907962A1 | 9/1990 | Germany . | |
| 247543 | 11/1986 | Japan | 15/250.01 |
| 2079587 | 1/1982 | United Kingdom . | |
| 2091544 | 8/1982 | United Kingdom . | |
| WO9010563 | 9/1990 | WIPO . | |
| WO9010561 | 9/1990 | WIPO . | |
| 10561 | 9/1990 | WIPO | 15/250.34 |
| 10563 | 9/1991 | WIPO | 15/250.34 |

*Primary Examiner*—Gary K. Graham
*Attorney, Agent, or Firm*—Dykema Gossett

[57] ABSTRACT

A windshield washing system, especially for motor vehicles, is provided with a wiper shaft, on which a wiper arm can be non-rotatably fastened and which wiper shaft includes an axial bore in order to receive a line made from form-stable plastic material with at least one channel, through which at least one washing nozzle moving in pendular motion with the wiper arm during the wiping process can be provided with washing liquid. In order to ensure that the wiper shaft takes along the line, the line is form-fittingly connected with the wiper shaft in the swivelling direction of said wiper shaft at the end of the wiper shaft turned away from the wiper arm.

25 Claims, 3 Drawing Sheets

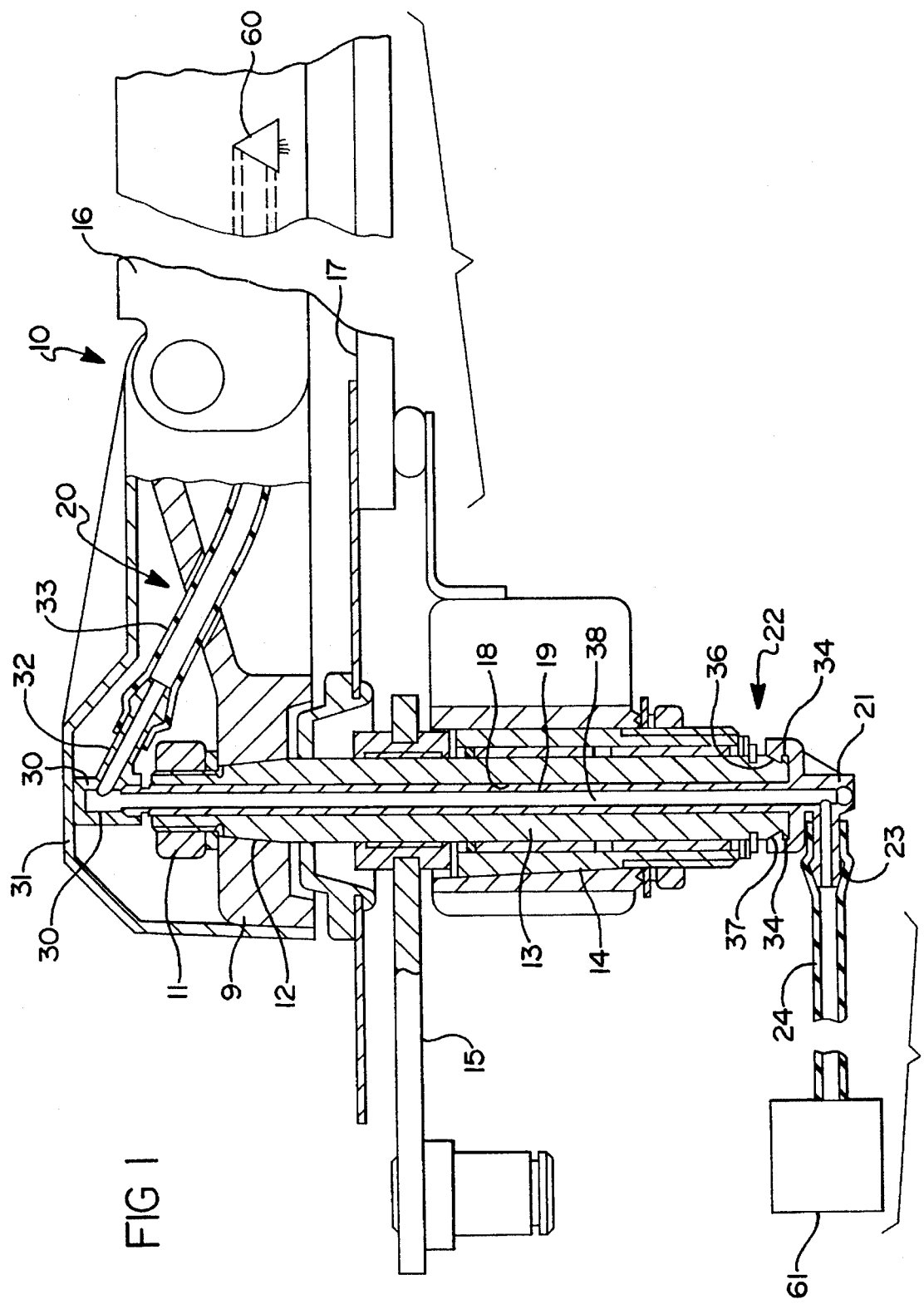

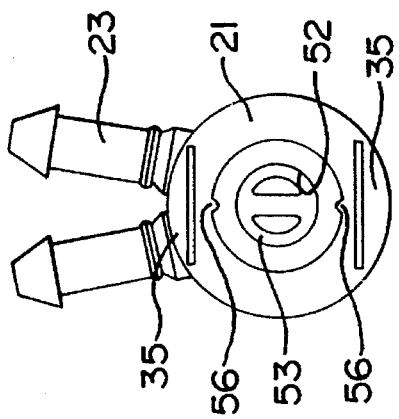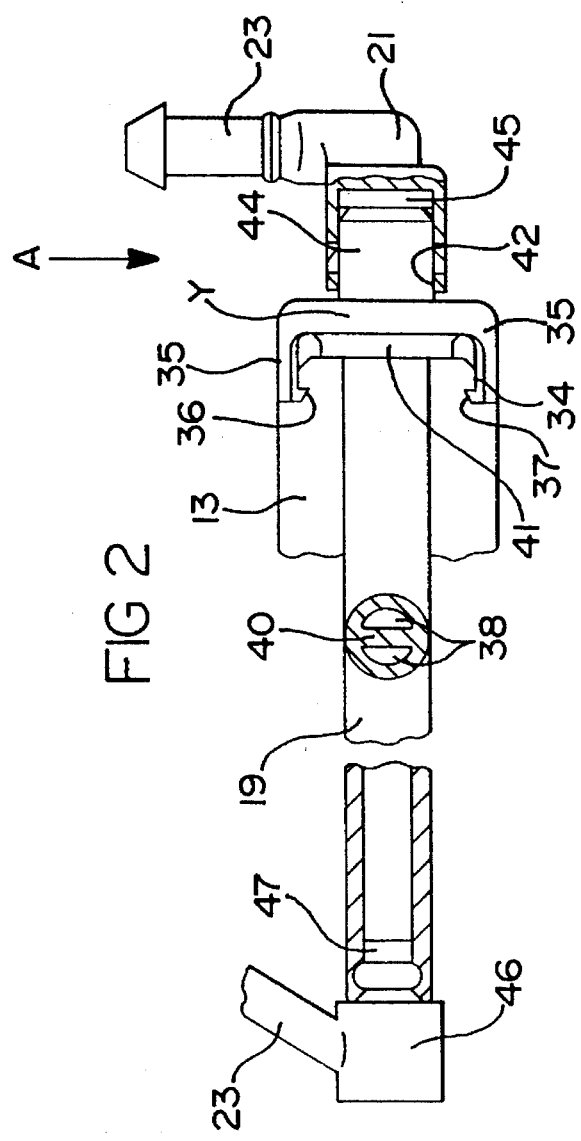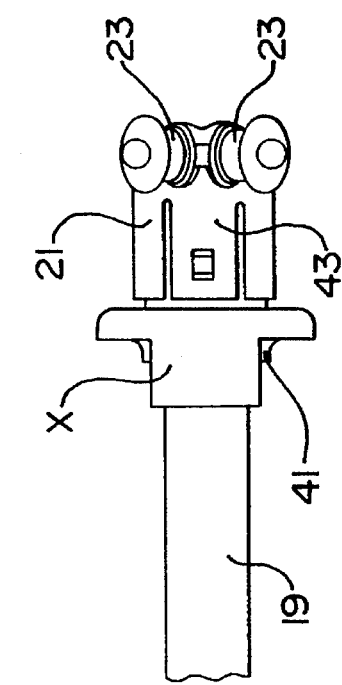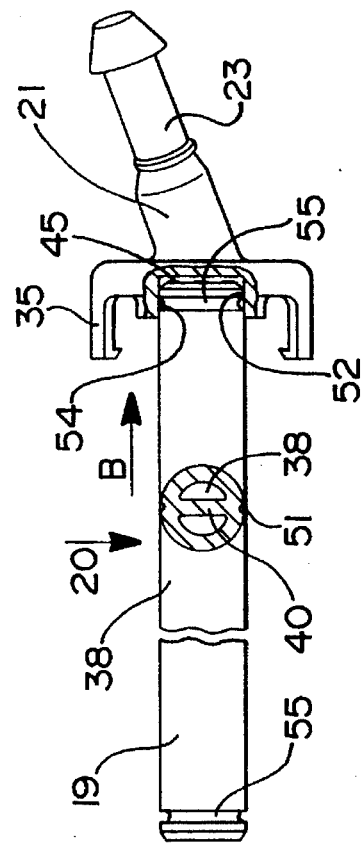

WINDSHIELD WASHING SYSTEM WITH FLUID PIPE IN WIPER SHAFT

BACKGROUND

The invention refers to a windshield washing system, especially used for motor vehicles.

It is known to insert a pipe piece of a washing liquid line into the continual axial bore of the wiper shaft or to inject the pipe piece, made from form stable plastic material directly into the bore. From the specification DE-OS 39 07 962, in which this is disclosed, it can be seen, that the pipe piece rotates with the wiper shaft, so that there is no relative motion between the pipe piece and the wiper shaft. This is an advantage, if there is a connection piece or a jet body, which is placed upon the end of the pipe piece situated at the side of the wiper arm and which moves along with the wiper arm. Consequently there is no relative motion between the pipe piece and the connection piece or the jet body, so that the point of connection can be sealed relatively easily. At the end of the wiper shaft, turned away from the wiper arm, more space is available than in the wiper arm, so that it is possible to have a connecting piece resting as well, relative to the pipe piece swinging in pendular motion along with the wiper shaft, in order to compensate the pendulum movement of a pipe union at the connecting piece by a flexible hose.

If the pipe is provided only with one channel, it is advantageous to arrange the pipe piece in the wiper shaft non-rotatably with respect to the wiper shaft, however, in order to control the washing liquid this is not absolutely necessary. It is different however, if the pipe piece comprises two channels, through which the different washing jets are supplied with washing liquid in a certain time sequence. If the pipe piece turns itself inside the wiper shaft, without the connecting piece or pieces rotating along with the wiper shaft, this may lead to a connection of both channels, or also to a supply with washing fluid which supply is contrary to the requested supply of the washing jets. It turned out, that in the windshield washing system shown in the German specification DE-OS 39 07 962 the protection against twisting between the wiper shaft and the washing liquid line is not guaranteed.

From the German patent application DE-OS 36 43 476, a windshield washing system in the form of a so-called reciprocating stroke wiper system is known, in which a washing liquid line integrally comprises a pipe piece with two channels guided through the wiper shaft, two tubes running within the gear housing of the wiper arm towards two washing jets and a lug, via which the line is fastened with screws at the gear housing. The washing liquid line is non-rotatably fastened at the fastening member of the wiper arm, which fastening member is represented by tile gear housing and therefore, also rests in relation to the wiper shaft. Though in case of wiper arms being constructed in the usual way, the proportion of space in the fastening member is so unfavorable, that a form-fitting fastening of the washing liquid line within the fastening member is impossible. Such kind of fixation may also lead to difficulties during the assembly and dismantling of a wiper arm onto or from the wiper shaft.

SUMMARY OF THE INVENTION

The object of the invention is to develop a windshield washing system in such a way that a protection against twisting between the wiper shaft and a pipe piece of a washing liquid system running in the wiper shaft is ensured, without that space being provided at the fastening member of the wiper arm and without the assembly or dismantling of the wiper arm being made more difficult.

This object will be achieved for a windshield washing system in the way that the line is connected form-fittingly with the wiper shaft in the swivelling direction of the wiper shaft at the end of said wiper shaft turned away from the wiper arm.

The easiest way to obtain protection against twisting between the wiper shaft and the washing liquid line is, to provide the wiper shaft with a flattened side at the outside and position the washing liquid line on the flattened side via a tab engagable at the outside of the wiper shaft. There is a groove advantageously included in the flattened side, which groove runs diagonally to the axial direction, in which groove the tab engages via a nose, so that the line is axially connected at the wiper shaft. In order to be able to fasten the groove near the end of the wiper shaft, on the one hand, and in order to achieve the required flexibility of the tab and sufficient stability of the form, which makes a certain thickness of the tab necessary, on the other hand, the tab is axially longer than the axial distance between the groove and the adjacent end of the wiper shaft. This greater length of the tab is received usefully by a flange at the line, which flange is situated in front of the front side of the wiper shaft and from which flange the tab keeps a distance, seen in vertical direction towards the axis of the wiper shaft.

The line can integrally comprise a pipe piece taken up by the wiper shaft and a connection piece. For this as well as for further embodiments the connecting piece is especially characterized in that it comprises a pipe union for a hose.

Particularly, if different lines have the same pipe pieces and only differentiate in the connecting pieces, for example, in the angle in which the pipe union or pipe unions come out, or because of injection molding reasons, it may be advantageous, if the washing liquid line comprises in several parts a pipe piece taken up by the wiper shaft and a connecting piece. Especially in dependency on production considerations a tab is situated at the pipe piece or at the connecting piece, via which tab the washing liquid line lies on a flattened side of the wiper shaft. In any case it is advantageous, if the connection between the pipe piece and the connecting piece is made non-rotatable by being form-fitting.

If the pipe piece of the line is provided with at least two channels separated from each other and if the connecting piece is form-fittingly connected directly with the wiper shaft, the connection between the pipe piece and the connecting piece is coded by means, which are fitted in its shape in order to lie on each other or to engage into each other. This codification shall ensure, that the pipe piece and the connecting piece can only be plugged together in such relative positions, in which the channels in the pipe piece and the corresponding channels in tile connecting piece are correspondent. In case of two channels in the pipe piece, there shall be two positions of the pipe piece with regard to the connecting piece in which positions these two parts can be plugged together. By such a codification it can be obtained that pipe piece and connecting piece are already form-fittingly connected.

It is difficult to manufacture long pipe pieces by injection molding. Also, for pipe pieces which are only different from each other by their length, different injection molding tools are necessary for each piece. Both make the manufacturing of such pipe pieces relatively expensive. Therefore, it is planned, that the pipe piece is cut off from an extruded pipe.

During the extruding process it is possible to manufacture pipes with any length by using an extrusion die, from which pipe pieces can be cut off in different lengths. It is possible to form means for a form-fitting connection respectively for a codification of the connection between the pipe and the connecting piece onto such an extruded pipe at once. It is easy to understand that the manufacture of pipe pieces by cutting them off from extruded pipes is also advantageous, if the pipe piece does not rest in relation to the wiper shaft, but rests in relation to the body of a motor vehicle. It is also not absolutely necessary, that the pipe piece is connected with a connecting piece at the end of the wiper arm turned away from the wiper shaft. It is rather possible that a hose is directly connected with the pipe piece. The same is valid for the end of the pipe piece situated at the side of the wiper arm.

If the pipe piece is extruded, it is advantageous that the connection between the pipe piece and the connecting piece is made in the way that the pipe piece is plugged into a recess of a connecting piece by way of one end. Within a channel of the pipe piece it is only difficult to make an undercut for a part of the connecting piece which has to be plugged in. However, to plug an end of the pipe piece into a recess of a connecting piece is also advantageous, if the pipe piece is injection molded as a single part. There are also advantages, if the pipe piece rests in relation to the car body.

A seal is advantageously squeezed between the front side of the pipe piece and the bottom of the recess at the connecting piece, because it is not difficult to put the seal into the recess. This arrangement of the seal is especially useful, if the pipe piece comprises several channels, which are separated from each other by a separating web. In the preferred embodiment, the seal is provided with a cross web, on which the separation web is positioned. Therefore, the seal seals the connection between the connecting piece and the pipe piece towards the outside and with regard to the different channels. This would not be possible with an O-ring or the like.

If the line with several parts is provided with a pipe piece taken up by the wiper shaft, as well as a first connecting piece at the end of the wiper shaft turned away from the wiper arm and a second connecting piece at the end of the wiper shaft situated at the side of the wiper arm, so both ends of the pipe piece are preferably formed alike. When the pipe piece is inserted into the wiper shaft, it is not necessary to take care, which end of the pipe piece is situated at the end of the wiper shaft turned away from the wiper arm or at the side of the wiper arm.

Several embodiments of a windshield washing system for motor vehicles according to the invention will be explained below by way of the attached drawings.

DESCRIPTION OF THE DRAWINGS

FIG. 1 shows a section of a first embodiment situated in the axis of the wiper shaft, in which embodiment a connecting piece and a pipe piece are integrally manufactured.

FIG. 2 shows a pipe piece and a connecting piece of a second embodiment, whereby pipe piece and connecting piece are made in two pieces.

FIG. 3 shows a view in direction of part A of FIG. 2.

FIG. 4 shows a pipe piece and connecting piece of a third embodiment.

FIG. 5 shows a top view of the connecting piece in the direction of the arrow B from FIG. 4.

DETAILED DESCRIPTION OF THE MENTION

Figure 6:
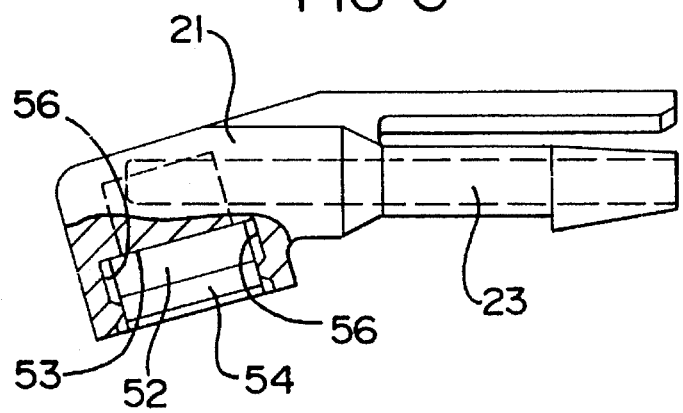
FIG. 6 shows a connecting piece situated at the side of the connecting piece for the pipe piece from FIG. 4, partly in cross-sectional view.

As shown in FIG. 1, in all embodiments there is a wiper arm 10 with a screw nut 11 non-rotatably fixed onto a conical, knurled section 12 of a wiper shaft 13. The wiper shaft 13 is rotatably mounted in a wiper bearing 14, which is fixed at the body of a motor vehicle and can be driven in pendulum motion via a bearing rocker 15 by an electric motor which is not shown in detail. The wiper arm 10 comprises a fastening member 9, by way of which the wiper arm 10 is positioned on the wiper shaft 13, and a joint member 16, which can be swivelled away from the windshield 17 of the motor vehicle, in order to facilitate cleaning the windshield manually or in order to make it possible to assemble or dismantle a wiper blade at the free end of the wiper arm.

There is at least one washing nozzle 60, not shown in detail, fastened at the wiper arm, which washing nozzle is provided with washing liquid by the wiper shaft 13 from a washing liquid tank 61, which is situated inside the body of the motor vehicle. Therefore, the wiper shaft 13 is provided with a central axial bore 18, into which a pipe piece 19 of a washing liquid line designated by 20 is inserted. The pipe piece 19 and a connecting piece 21, which is situated at the end 22 of the wiper shaft 13 turned away from the wiper arm and which comprises a connection piece or pipe union 23, are integrally made from plastic material. The pipe union 23 generally comes out perpendicular with respect to the axis of the wiper shaft and therefore to the axis of the pipe piece. There is a flexible silicone hose 24 slipped over the pipe union 23. A further connecting piece 30 is associated with the washing liquid line 20, which connecting piece 30 is put onto the pipe piece 19 above the screw nut 11, which pipe piece protrudes from the wiper shaft 13 and is covered by a plastic cap 31, as well as the whole fastening member 9 of the wiper arm 10. Starting from a pipe union 32 of the connecting piece 30 a flexible hose 33 runs along the wiper arm 10 to the washing nozzle.

In order to have the pipe piece 19, together with the connecting piece 21 moving synchronously with the wiper shaft 13 and the wiper arm 10, these parts of the washing liquid line 20 at the end 22 of the wiper shaft 13 are form-fittingly connected with the wiper shaft. The form-fitting connection is produced by two diametrically opposite flattened sides 34 on wiper shaft 13 and two tabs 35 (FIG. 2) on the pipe piece 19 or on the connecting piece 21, whereby the tabs 35 lie on the flattened sides 34 by way of their straight inner sides. Each flattened side 34 includes a groove 36 at a distance to the near front side of the wiper shaft 13 running crosswise to the axial direction of this shaft, whereby a tab 35 engages into each groove 36 by way of a nose 37. The grooves 36 and the noses 37 also contribute to the protection against twisting between pipe piece 19 and wiper shaft 13, and secure the pipe piece 19 and the connecting piece 21 in the axial direction at the wiper shaft 13. The tabs are formed in a slightly resilient way so that the noses 37 can reach the grooves 36 when the pipe piece is inserted into the wiper shaft.

As the pipe piece 19 comprises only one single channel 38 in the embodiment according to FIG. 1, the pipe piece 19 and the connecting piece 21 turned away from the wiper arm are shown in FIGS. 2 and 3 of a second embodiment, in which the pipe piece is provided with two channels 38 separated by a separation web 40 and correspondingly the connecting piece 21 is provided with two pipe unions 23. The pipe piece 19 and the connecting piece 21 are preferably made in two pieces from plastic material. There is the advantage, that the parts can be manufactured easily in an injection molding process and that different connecting pieces 21 can be fixed to the same pipe piece 19.

Similar to the corresponding unit from FIG. 1, the pipe piece 19 and connecting piece 21 are fixed at the wiper shaft 13, which is only partially shown in FIG. 2. The tabs 35 are integrally situated at the pipe piece 19. The pipe piece comprises a flange 41, lying on the front side of the wiper shaft 13, from which flange 41 the tabs are spaced, seen vertically to the axis of the wiper shaft 13. In this way, the tabs 35 are axially longer than the axial distance between the grooves 36 and the front side of the wiper shaft 13. Therefore, the tabs can spring more easily, without having to increase the distance of the grooves 36 from said front side and therefore having to lengthen the wiper shaft.

Figure 8:
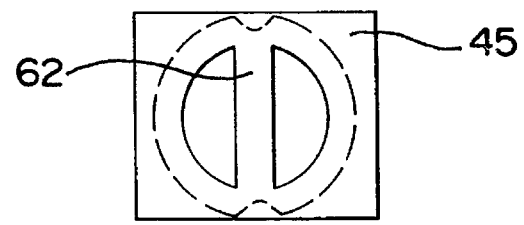
FIG. 8 shows a seal used in the embodiment according to FIGS. 2 to 5.

The connecting piece 21 is latched on a rectangular union 44 of the pipe piece 19 by way of a rectangular recess, provided with two locking springs 43 cut out in two side walls opposite to each other, whereby locking lugs situated at their union 44 are latched into apertures of the springs 43. A seal 45 is squeezed between the front side of the union 44 and the bottom of the recess 42, which seal 45 is shown in FIG. 8. The essential thing of this seal is a cross web 62 which guarantees a safe separation of the two channels 38 in the pipe piece 19 and of the corresponding channels in the connecting piece 21.

A connecting piece 46 is put onto the end of the pipe piece 19 as in FIG. 2, situated at the side of the wiper arm, which connecting piece 46 shows two pipe unions 23 like the connecting piece 21 and which connecting piece 46 is plugged into the two channels 38 of the pipe piece 19 by way of a channel stump or nipple 47. As in the embodiment according to FIG. 1 the pipe union 32 of the connecting piece 30 and the pipe union 23 of the connecting piece 46 shall point in the direction of the wiper arm. Correspondingly the pipe piece 19 has to be positioned with respect to the wiper shaft 13 in a certain way, which is guaranteed by the position, at which the flattened sides are made at the wiper shaft 13 and by the position, at which the tabs 35 are fastened at the pipe piece 19. It may still be possible, to insert the pipe piece 19 into the wiper shaft 13 in two positions turned by 180 degrees against each other, however, both of these positions are completely equal and allow insertion of the connecting piece 46 in the correct position.

Figure 7:
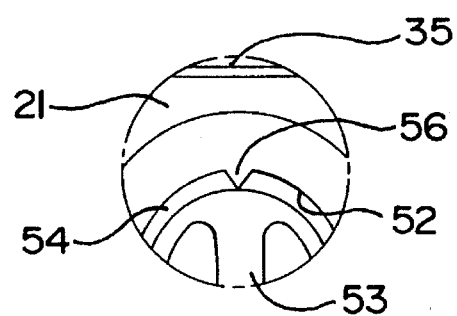
FIG. 7 is an enlarged view of a section of FIG. 5.

FIGS. 4, 5 and 6 show parts of a washing liquid line 20 of a further embodiment, in which, as in the embodiment just described, a pipe piece 19 and a connecting piece 21 turned away from the wiper arm are made in two pieces again. The pipe piece 19 is a part of a long pipe manufactured in an extrusion process and is provided with two channels 38 separated by a separation web 40 and shows two notches 51, which run diametrically opposite each other along the pipe piece 19 in the area of the separation web 40. Both ends of the pipe piece 19 are equally formed and inserted into a recess 52 of a connecting piece 21 turned away from the wiper arm and, respectively, a recess 52 of a connecting piece 46 situated at the side of the wiper arm. A seal 45 with a separation web 62 is again squeezed between the end of the pipe piece 19 and the bottom 53 of the respective recess 52, the outer circular-shaped form of which seal is indicated in FIG. 7 in broken lines. There is a ring bulge 54 projecting into the recess 52 of each connecting piece, which ring bulge 54 engages into a ring groove 55 of the pipe piece 19. The tabs 35 for fastening the unit of pipe piece 19 and connecting piece 21 at the wiper shaft 13 are situated at the connecting piece 21, different from the embodiment according to FIG. 2. Because of the distance between the tabs 35 and the recess 52 they can be made as long as in the embodiment according to FIG. 2.

Due to the flattened sides 34 at the wiper shaft 13 and due to the tabs 35 the connecting piece 21 can be fastened at the wiper shaft only in two positions turned against each other by 180 degrees. In order to have both channels 38 in the pipe piece 19 meet in the right position above the corresponding channels of the connecting piece 21 two notches 51 and two ribs are provided, which ribs project into the recess 52, run in axial direction and engage into tile notches 51, one of which ribs 56 can be clearly recognized in the section according to FIG. 7. The connecting piece 46 at the side of the wiper arm is, in its recess 52 also provided with two ribs 56 running in longitudinal direction, so that said connecting piece 46 can be put onto the pipe piece 19 only in two certain positions. Usually, during the assembly, the position of the two positions is chosen, in which the two pipe unions 23 of the connecting piece 46 point towards the end of the wiper arm, carrying a wiper blade. The notches 51 and the ribs 56 are means for codification of the connections between the pipe piece 19 and the connecting pieces 21 and 46. Thereby, the number of the two possible positions corresponds to the twofold symmetry of the cross-section of the pipe piece 19. A comparison of FIG. 4 with 5 also shows, that the pipe unions 23 can be removed from the connecting piece 21 in different ways without any difficulties, whereby the connecting pieces 21, which are different, are formed identically however, with regard to fastening them at the wiper shaft 13 and to the connection to the pipe piece 19.

What is claimed is:

1. A windshield washing system, comprising an elongated wiper shaft on which a wiper arm is non-rotatably fixed, said wiper shaft comprising a continual axial bore receiving a line with at least one channel for supplying washing liquid to at least one washing nozzle moving with the wiper arm during a wiping process, said line being form-fittingly connected with the wiper shaft, wherein the wiper shaft has at least one flattened side and wherein the line is positioned with respect to the flattened side using at least one tab on said line, each said tab selectively, respectively engaging one of said at least one flattened side.

2. A windshield washing system according to claim 1, wherein the line includes at least two channels through which at least two washing nozzles can be supplied with washing liquid independent of each other.

3. A windshield washing system according to claim 1, wherein the flattened side includes a groove which runs generally perpendicular to the axial direction of said wiper shaft, said tab including a nose, said nose of said tab engaging said groove.

4. A windshield washing system according to claim 3, wherein the tab is axially longer than an axial distance between the groove and an adjacent end of the wiper shaft.

5. A windshield washing system according to claim 4, wherein the line includes a flange situated in front of (a) said end of the wiper shaft, from which flange the tab keeps a distance, seen in vertical direction to the axis of the wiper shaft.

6. A windshield washing system according to claim 1, wherein there are a pair of diametrically opposed flattened sides on the wiper shaft and a pair of tabs on the line.

7. A windshield washing system according to claim 1, wherein the line comprises, in several pieces, a pipe piece within the wiper shaft and a connecting piece and wherein the tab is situated on the pipe piece.

8. A windshield washing system according to claim 1, wherein the line comprises, in several pieces, a pipe piece within the wiper shaft and a connecting piece and wherein the tab is situated on the connecting piece.

9. A windshield washing system according to claim 1, wherein the line comprises, in several pieces, a pipe piece within the wiper shaft with at least two channels separated from each other and a connecting piece which is situated at an end of the wiper shaft once the pipe piece and the connecting piece being form-fittingly connected with the wiper shaft, and wherein a connection between the pipe piece and the connecting piece is made by means of coding means thereon, which are matingly fitted to one another.

10. A windshield washing system according to claim 9, wherein in the pipe piece there are at least two channels symmetrically arranged in the pipe piece and wherein the pipe piece can be connected with the connecting piece in angular positions corresponding to the number of channels and said positions being angularly spaced by as many angular degrees as the result of 360 degrees divided by the number of channels.

11. A windshield washing system according to claim 9, wherein the means for coding are formed by at least one groove running in an axial direction on one of said pipe piece and connecting piece and at least one rib on the other of said pipe piece and connecting piece.

12. A windshield washing system according to claim 1, wherein the line includes a pipe piece received by the wiper shaft and wherein the pipe piece is cut off from an extruded pipe.

13. A windshield washing system according to claim 1, said line including a connecting piece with a recess, and an elongated pipe piece, an end of the pipe piece plugged into the recess of the connecting piece.

14. A windshield washing system according to claim 13, wherein the pipe piece has a ring groove on an outside periphery running generally crosswise to its longitudinal direction and the connecting piece comprises a ring bulge which engages into the ring groove.

15. A windshield washing system according to claim 13, wherein a seal is squeezed between the end of the pipe piece and the connecting piece.

16. A windshield washing system according to claim 15, wherein the seal is provided with a cross web.

17. A windshield washing system according to claim 1, wherein the line comprises, in several pieces, a pipe piece received by the wiper shaft as well as a first connecting piece at an end of the wiper shaft turned away from the wiper arm and an second connecting piece at an end of the wiper shaft situated adjacent the wiper arm and wherein the two ends of the pipe piece are formed idental.

18. A windshield washing system, said system comprising a wiper shaft upon which a wiper arm is mounted for oscillating motion, said wiper shaft having a longitudinal bore extending therethrough, a fluid pipe positioned within said bore for supplying washing liquid to at least one washing nozzle moving with the wiper arm during a wiping process, and at least one coupling for interconnecting said fluid pipe to said wiper shaft for unified movement of said fluid pipe and wiper shaft and for orienting said fluid pipe with respect to said wiper shaft in a predetermined orientation wherein said fluid pipe can be properly interconnected to a fluid supply, wherein said coupling and said wiper shaft have mating surfaces, one of said surfaces having at least one tab and the other having at least one flat side and a groove for respectively receiving one of said at least one tab.

19. The wiper and washing system of claim 18, wherein said fluid pipe has two channels and said coupling interconnects said fluid pipe and said wiper shaft in one of two possible positions, said positions being diametrically opposite.

20. The wiper and washing system of claim 18, wherein said fluid pipe has a plurality of longitudinal channels and said coupling interconnects said fluid pipe and said wiper shaft in predetermined angular and positions corresponding to the number of channels and said positions being angularly spaced by as many angular degrees as the result of 360 degrees divided by the number of channels.

21. The wiper and washing system of claim 18, wherein said coupling and said fluid pipe are integrally formed.

22. The wiper and washing system of claim 18, wherein said coupling includes a recess for receipt of said fluid pipe, said recess and said pipe having means thereon for limiting the angular relationship of said fluid pipe and said coupling to predetermined angles.

23. The wiper and washing system of claim 18, wherein said coupling and said fluid pipe include respectively at least one rib and at least one groove which mate upon connection of said coupling to said fluid pipe.

24. The wiper and washing system of claim 18, further including a second coupling attached to said pipe opposite said first coupling, said couplings and said wiper shaft being uniformly oriented.

25. A windshield washing system according to claim 1, wherein said line comprises a pipe piece and a connecting piece selectively secured to said pipe piece.

* * * * *

UNITED STATES PATENT AND TRADEMARK OFFICE
CERTIFICATE OF CORRECTION

PATENT NO. : 5,454,134
DATED : 10/03/95
INVENTOR(S) : Edele et al

It is certified that error appears in the above-indentified patent and that said Letters Patent is hereby corrected as shown below:

In claim 5, column 6, line 63, please delete "(a)";
In claim 9, column 7, line 15, please delete "once" and insert
--one of--;

Signed and Sealed this

Sixteenth Day of April, 1996

Attest:

BRUCE LEHMAN

Attesting Officer

Commissioner of Patents and Trademarks